(12) United States Patent
Borracci

(10) Patent No.: US 7,946,501 B2
(45) Date of Patent: May 24, 2011

(54) UNIVERSAL SMART CARD

(75) Inventor: Fabrizio Borracci, Udine (IT)

(73) Assignees: Fabrizio Borracci (IT); Matteo Amoroso (IT)

( * ) Notice: Subject to any disclaimer, the term of this patent is extended or adjusted under 35 U.S.C. 154(b) by 0 days.

(21) Appl. No.: 11/967,357

(22) Filed: Dec. 31, 2007

(65) Prior Publication Data
US 2008/0164325 A1    Jul. 10, 2008

Related U.S. Application Data

(63) Continuation of application No. PCT/EP2006/006167, filed on Jun. 27, 2006.

(30) Foreign Application Priority Data

Jul. 1, 2005 (IT) .............................. UD2005A0111
Feb. 8, 2006 (IT) .............................. UD2006A0028

(51) Int. Cl.
  *G06K 19/06* (2006.01)
  *G06K 5/00* (2006.01)
  *G06K 19/00* (2006.01)
  *G06F 7/08* (2006.01)
  *G06Q 20/00* (2006.01)

(52) U.S. Cl. ........ 235/492; 235/380; 235/381; 235/382; 235/487; 705/17; 705/18; 705/65; 705/67

(58) Field of Classification Search ................... 235/380, 235/492, 375, 381, 382, 487; 705/17, 18, 705/41, 64–67
See application file for complete search history.

(56) References Cited

U.S. PATENT DOCUMENTS

| 5,623,552 | A | * | 4/1997 | Lane | 382/124 |
| 5,907,142 | A | * | 5/1999 | Kelsey | 235/380 |
| 5,955,961 | A | * | 9/1999 | Wallerstein | 340/5.4 |
| 6,012,636 | A | * | 1/2000 | Smith | 235/380 |
| 6,095,416 | A | * | 8/2000 | Grant et al. | 235/449 |
| 6,592,044 | B1 | * | 7/2003 | Wong et al. | 235/493 |
| 6,925,439 | B1 | * | 8/2005 | Pitroda | 705/1 |
| 7,097,108 | B2 | * | 8/2006 | Zellner et al. | 235/492 |
| 7,257,714 | B1 | * | 8/2007 | Shen | 713/186 |

(Continued)

FOREIGN PATENT DOCUMENTS
EP    1 326 196    7/2003
(Continued)

OTHER PUBLICATIONS
International Search Report, Sep. 15, 2006, 4 pages.
(Continued)

*Primary Examiner* — Thien M. Le
*Assistant Examiner* — April A Taylor
(74) *Attorney, Agent, or Firm* — St. Onge Steward Johnston & Reens LLC

(57) ABSTRACT

Universal electronic card, of the smart card or intelligent card type, similar to a form of plastic card, with integrated circuital elements which are integrated in the thickness of the stratified card and within it at least one microchip, structured integrally with: i—a microprocessor associated to a memory; ii—an interchangeable flat battery within the card-thickness able to power-supply the microprocessor and the memory; iii—at least one data transmission device connected to the microprocessor and/or to the memory; iv—one fingerprint reader device integrated in it and to the processor system to read the imprint of the user, checking its authenticity before allowing the access at its various functions.

17 Claims, 4 Drawing Sheets

U.S. PATENT DOCUMENTS

| | | | |
|---|---|---|---|
| 7,278,581 B2 * | 10/2007 | Ong | 235/492 |
| 7,318,550 B2 * | 1/2008 | Bonalle et al. | 235/380 |
| 7,360,688 B1 * | 4/2008 | Harris | 235/380 |
| 2002/0153424 A1 * | 10/2002 | Li | 235/492 |
| 2003/0019942 A1 | 1/2003 | Blossom | |
| 2003/0174049 A1 | 9/2003 | Beigel et al. | |
| 2004/0050930 A1 * | 3/2004 | Rowe | 235/380 |
| 2004/0203352 A1 | 10/2004 | Hall et al. | |
| 2006/0131393 A1 | 6/2006 | Cok et al. | |
| 2006/0261174 A1 * | 11/2006 | Zellner et al. | 235/492 |
| 2008/0035738 A1 * | 2/2008 | Mullen | 235/492 |

FOREIGN PATENT DOCUMENTS

GB   2 407 189   4/2005

OTHER PUBLICATIONS

Written Opinion, Sep. 15, 2006, 5 pages.

* cited by examiner

Section X-X

UNIVERSAL SMART CARD

CROSS-REFERENCE TO RELATED APPLICATIONS

The present application is a continuation of pending International patent application PCT/EP2006/006167 filed on Jun. 27, 2006 which designates the United States and claims priority from Italian patent application UD2005A000111 filed on Jul. 1, 2005 and Italian patent application UD2006A000028 filed Feb. 8, 2006, the content of which is incorporated herein by reference.

FIELD OF THE INVENTION

Technical Field

This invention relates to a smart card as a universal electronic card, whose characteristics correspond to the precharacterizing part of the main claim.

Use

The use is substantially directed to the electronic service of data treatment, to the sector of telecommunications and to everything connected with electronic data processing.

BACKGROUND OF THE INVENTION

1. Background Art

At present smart cards or intelligent cards are known and in use which can carry out a very great number of functions, such as for identification, for payments and collections, as well as for a plurality of other services.

At present the USB keys are known which can carry out many functions physically connecting at least to one of the electronic apparatus.

2. Examples of Prior Art
US2003/019942 A1 (BLOSSOM GEORGE W.)
US2004/203352 A1 (HALL ERIC S ET ALL)
GB2407189 A (VODAFONE GROUP PLC)
EP1326196 A (NAGNEK CORPORATION)

3. Problems and Drawbacks of the Prior Art

The problems and drawbacks of the prior art refer substantially to a limitation of functions.

In other words the current cards have a limited use for certain services, other services being satisfied by other devices generally of different form.

SUMMARY OF THE INVENTION

Scope of the invention

The scope of the invention is to solve the above-mentioned problems and drawbacks and supply an intelligent card able to carry out a large amount of functions and able to assure identity check of the user.

Solution of the Problem and Identification of the Features of the Invention

The problem is solved with the characteristics of the main claim.

The sub-claims represent advantageous preferred solutions that supply a better performance and secure personalization.

Advantages

In this way there is the advantage of having a card able to carry out a large variety of functions at present unavailable.

In particular it can also be noticed that such a card can be associated to the performance of the common USB key.

Moreover, if one loses the card or it is thieved for example, a third person cannot use it because only the fingerprint of the true owner can authorize the use.

BRIEF DESCRIPTION OF THE DRAWINGS

Description of the Preferred Solution

For a better understanding the invention is described in preferred solution with the help of attached figures, wherein.

DETAILED DESCRIPTION OF THE INVENTION

Figure 1:
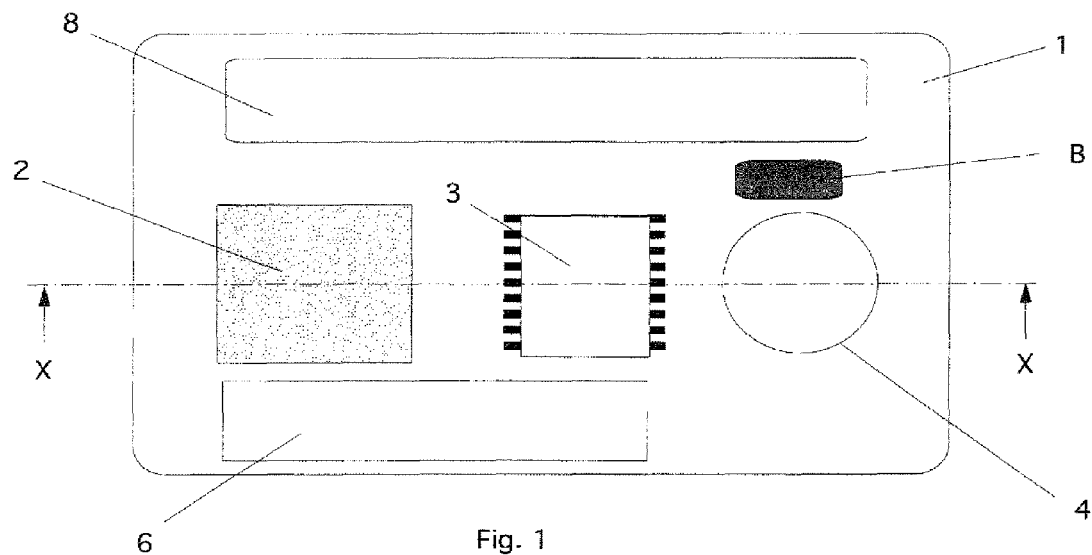
FIG. 1—it represents the plan-view of a card in one possible form with the respective uncovered hardware inserts.
Figure 2:
FIG. 2—it represents the sectional view of the card of FIG. 1.
Figure 3:
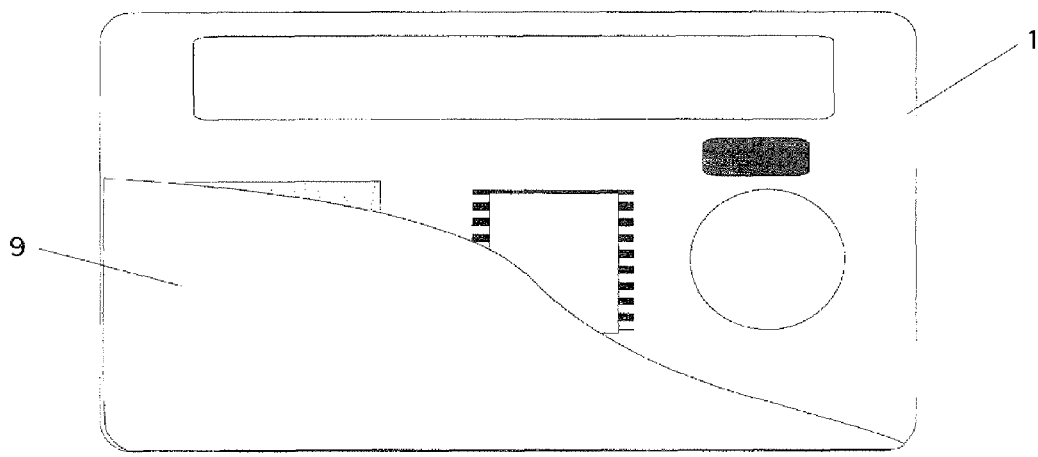
FIG. 3—it represents the view of the card of FIG. 1 with partial removal of the coating plastic covering.

Detailed description of the invention in relation to the first solutions is represented in FIGS. 1 to 7.

According to the figures it can be observed that the invention refers to a universal electronic card, or universal smart card with telecommunication means.

In the figures it can be seen that the new card looks like a very common credit card (sizes about mm 850×550×30), the reduced sizes of internal components will allow to produce a plasticized card and aesthetically able to be customized with prints of logos, images or other.

The same has a support basis in integrated-circuit plastic material (1) with the respective components such as microprocessor or CPU (2), memory (6), transmission module (3), battery (4), eventual LCD screen (8) and ON/OFF button (b).

The card thereinafter for simplicity called card or smart card, will be able to receive, memorize and transfer multiple data and information simply approaching the electronic apparatus equipped with Wi-Fi and bluetooth technology or higher or similar communication standard. Therefore, it can communicate with different apparatus in commerce as computers, portable pc, palmtops, cell phones, satellitaire connectors, electronic apparatus in general etc.

Moreover the card using the radio communication with no need of cables or USB connection can be employed for many uses or applications.

Figure 4:
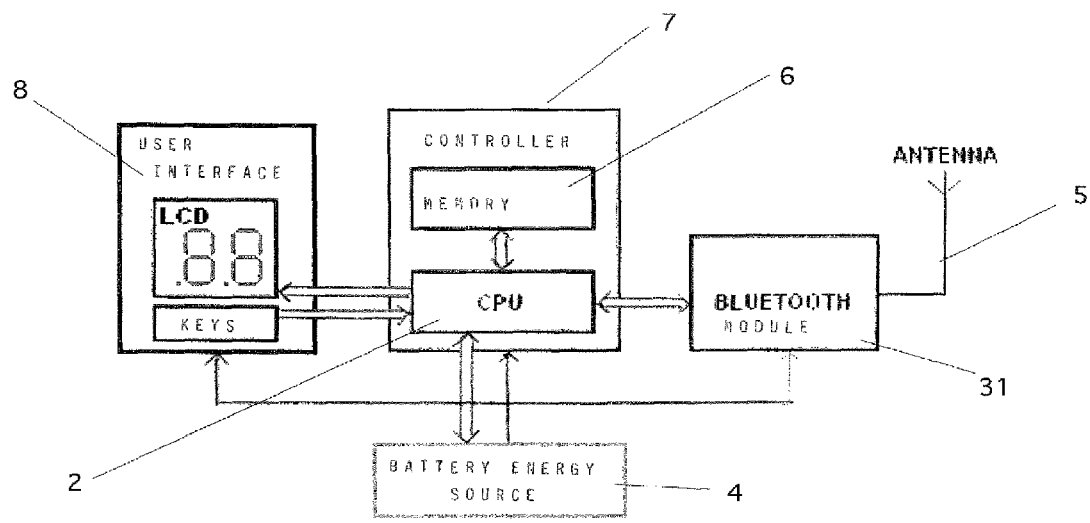
FIG. 4—it represents the view of a block diagram of the card in a first form of solution.

Card model bluetooth FIG. 4
It consist of:
Bluetooth module (31);
microcontroller (7) that includes CPU processor (2) and static memory (6);
battery (4);
antenna (5);
Optional LCD screen (8).

Therefore, it consists of five elements: Bluetooth module that allows the communication with all the apparatus equipped with Bluetooth technology; a microcontroller (7) that allows to store new data and to transmit those which it already contains and a battery (4) allowing the card to work, which contains an antenna (5). Moreover, it will be possible to add an LCD screen (8) for data reading.

In this way the transmission and data reception are ensured, as well as every gender of apparatus equipped with Bluetooth technology, without the need of using any connecting cable of easy use and available to all.

Figure 5:
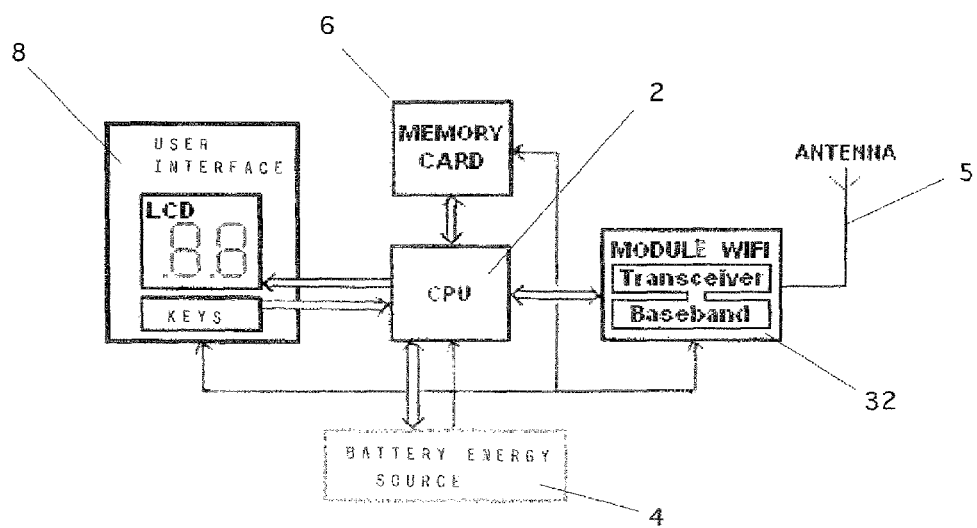
FIG. 5—it represents the view of a block diagram of the card in a second form of solution.

Card model Wi-Fi FIG. 5

It is composed of:
Wi-Fi module with transceiver and Baseband (3);
CPU (2);
memory (6);
battery (4);
antenna (5);
Optional LCD screen (8).

Consequently, this solution is composed of six elements: Wi-Fi module (3) that allows the communication with all the apparatus equipped with Wi-Fi technology; a CPU (2) that allows to store new data and to transmit those which it already contains, a memory (6) that can vary on the basis of the needs and a battery (4) allowing the card to work, which contains an antenna (5). Moreover, it will be possible to add a LCD screen (8) for data reading.

The transmission and data reception between the card and every gender of apparatus equipped with Wi-Fi technology occurs without the need of using any connecting cable of easy use and available to all.

Figure 6:
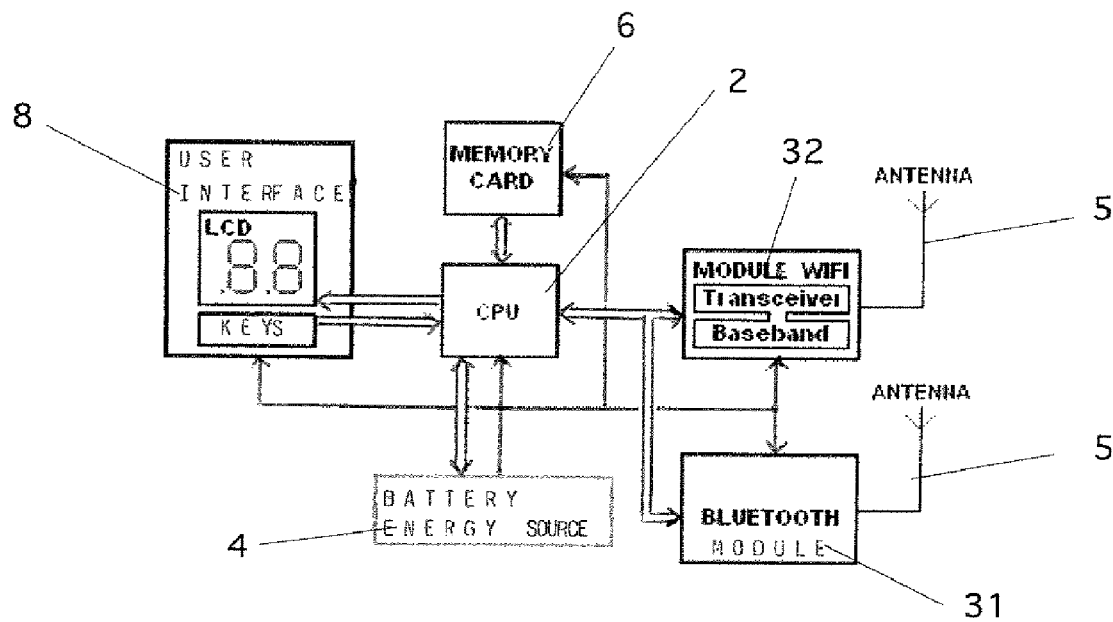
FIG. 6—it represents the view of a block diagram of the card in a third form of solution that substantially integrates the first two.

Card model bluetooth/Wi-Fi FIG. 6

The card consists of:
Bluetooth module (31);
Wi-Fi module (32);
processor (2) and memory (6) (if necessary integrated in microcontroller (7), as from FIG. 4);
battery (4);
antenna (5);
Optional LCD screen (8).

This solution consists of five elements: Wi-Fi module (32), Bluetooth module (21) that allows the communication with all the apparatus equipped with Wi-Fi and Bluetooth technology; a CPU (2) that allows to store new data and to transmit those which it already contains, a memory (6) and a battery (4) allowing the card to work, which contains an antenna (5). Moreover, it will be possible to add a LCD screen for data reading.

Transmission and data reception between the card and every gender of apparatus equipped with Bluetooth technology and Wi-Fi technology, without the need of using any connecting cable.

Furthermore, this solution allows to make the converter function between the two communication systems.

Uses and Applications

Uses and applications can be quite different e.g. not limitative:
Business cards,
Presentation of firms and services, price-list,
Data base,
Index-book,
Music, games and music patterns,
Pre-paid cards, electronic record accounting device, electronic payment instruments in general,
Service card, authentication cards, subscriptions,
Identification cards, sanitary data, personal data, attendance cards,
Lunch cards, payment ticket, bus subscription, railways, and similar,
Automatic delivery machines, copy machines,
Control and communication with electronic apparatus,
Telematic service supply, access to PC or other,
Message, file, data, fingerprint and digital signature coding
Telematic and e.commerce recognition, protected internet services,
Info mobility, motorways pass, parking card, Tele-pass, access-control, Memorisation and data transfer, images, photos, etc.

Example of Use

The USC card can be utilized as a safe and secure electronic business card.

As regards aesthetic features, it will be possible to personalize it with the logo of the Company, and thanks to the incorporated chip inside it we can find the data of the company itself:
heading;
addresses of various seats;
telephone numbers;
number of Fax;
e-mail;
Website;
VAT number;
description of services that the company offers.

The data can be used immediately from the receiving apparatus as the card is approached with the advantage that the data are not introduced in the receiving apparatus with the keyboard.

When the card is approached to a cellular phone endowed with Bluetooth technology, the telephone number of the Company will appear on the display of the phone and the call can be immediately sent; moreover we can immediately memorize the telephone number in the index-book of the cell-phone.

Instead, when the card is approached to a computer endowed with Bluetooth technology, the system will show the data contained in the card requiring the reading and the memorisation of the private-data in the different archives (private-data for invoicing program, mail for outlook, lists and/or services offered by the company, other).

One can also use the card for inserting the destination in the GPS apparatus equipped with Bluetooth technology without having to digit the address, for inserting possible stops as hotels, restaurants or for organizing a pre-defined route.

A particularity is that for the description of services that the Company offers it will be possible to memorize it in several languages and to show it according to the needs of the user.

The card can also be utilized by the financial bank sector, by the public administration, in the field of transports and by the enterprises as a substitutive product of current Card or Smart card in general.

Technical Specifications

Therefore, the main object of the card (cordless) is that of communicating with different types of devices, for instance cellular telephones, palmtops, computer, notebook, or other electronic devices, etc.

On the basis of the data amount to transmit/receive, the devices will utilize a different technology (Wireless or Bluetooth).

When the data flux to transmit/receive is low (as in the cell-phones and palmtops), the used technology will be the Bluetooth (or new similar communication standard or higher), while for the transfer/reception of a larger data amount (as in the file exchange between computers), the indicated standard will be the Wi-Fi (Wireless Fidelity—IEEE 802.11b or new similar or higher communication standard, example 802.11a/b/i/g).

Naturally it will be possible to realise different product typologies with different prices, the product will vary according to the type of connected device and data amount to transmit General Structure Bluetooth Card The Card consists of a Bluetooth module managed by a central processor, connected to a memory.

The Bluetooth module will allow the cordless communication between the card and the other devices.

In the memory the data of clients are stored.

In the most advantageous solution a single microcontroller component (7) is used for integrating the processor (2) and the memory (6). The power supply by means of the battery (4) is realised during the transmission of data and after having pressed the key for receiving or transmitting (b).

For some specific use e.g. the pre-paid card or the debit/credit cards, in the card one can add a device to LCD liquid crystals (8) to verify the data e.g. the residual credit.

Components

Examples of components with sizes are described in the enclosed table 01:
Table 01
Dimension component Ref.
National Instruments LMX9820
Nluetooth Module port serial 10.1×14.0×1.9 mm 31
Motorola MC68HC908QT1 5.50×8.20×2.05 mm CPU 2
Varta battery CR2032 Diameter 20.0 mm 4
WIFI card In case of the use of the Wi-Fi standard instead of the Bluetooth, it will be possible to transfer a larger amount of data and consequently the card can be used to support larger files as audio, video, etc. communicating especially with computers by means of the WLAN cordless net (Local Wireless Network area).

As the need for memory of each user is variable depending on the naturalness of stored files, in this case one can choose to add a card memory (SD Card, compact Flash).

The most significant physical change is the implementation of the Wi-Fi module instead of the Bluetooth module.

In table 02 the necessary components for the IEEE standard radio 802.11b are described as well as a suggestion of memory, with their prices and sizes.

For some specific use e.g. the pre-paid card or the debit/credit cards, in the card one can add a device to LCD liquid crystals (8) to verify the data e.g. the residual credit.

Components

Table 02
Dimension component Ref.
Texas TNETW1100B-MAC/Baseband 12.0×12.0 mm 32
Maxim MAX2822-802.11b Transceiver 7.0×7.0 mm 32
Memory SD Card 64 MB 32.0×24.0 mm 6

The cost and sizes of the components are similar to the previous ones, except for the memory of high capacity that should be added according to the need of the user.

The processor and the battery could be replaced with similar components with higher speed and capacity respectively.

Card Bluetooth/WIFI

In order to reach all the possible wireless devices, the hybrid card is the indicated one, using the Wi-Fi and Bluetooth modules together.

Its general structure is illustrated in FIG. 6. Obviously the cost and the power consumption are equivalent to the whole components previously described.

Description of the Working System

Figure 7:
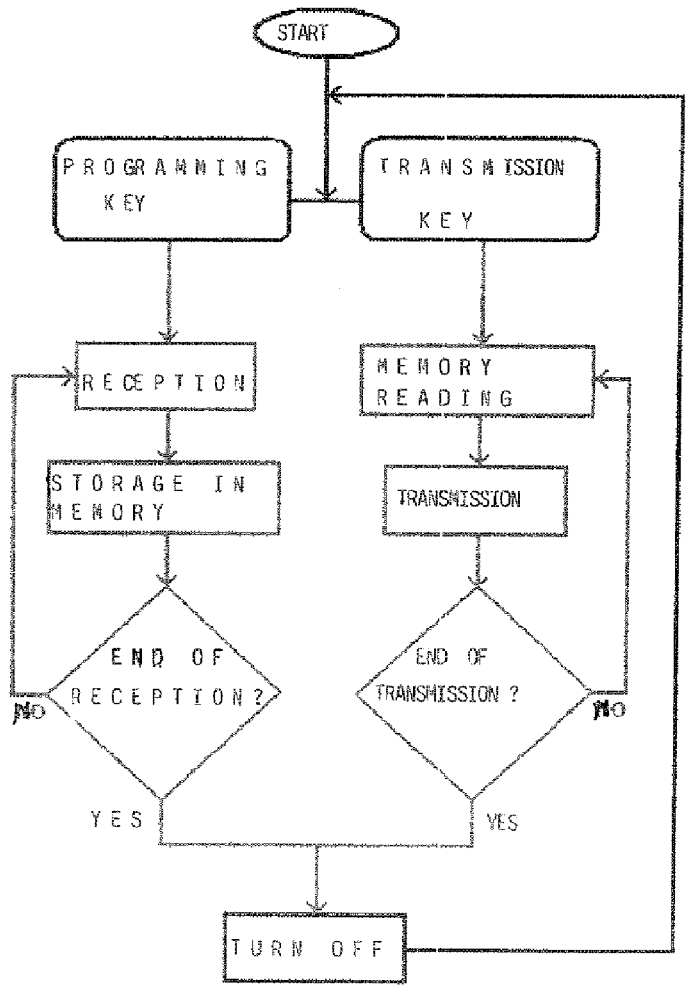
FIG. 7—it represents the schematic view of an operative-functional block diagram.

The description of the working of the card is illustrated in the block diagram of FIG. 7. Start happens when the energy source is connected to the circuit.

At this time the card is off, thus it does not consume energy.

The activation can be carried out by the programming key or the transmission key.

When the programming key is activated, the card comes into programming modality, which means that the received data are stored in the memory.

When the reception and the storing are completed, the card will stop going OFF automatically.

Otherwise when one presses the transmission key, the data contained in the memory start to be transmitted.

At the end of the transmission the card goes OFF for saving energy and returns to the initial state.

Advanced Personal Solution

Figure 1A:
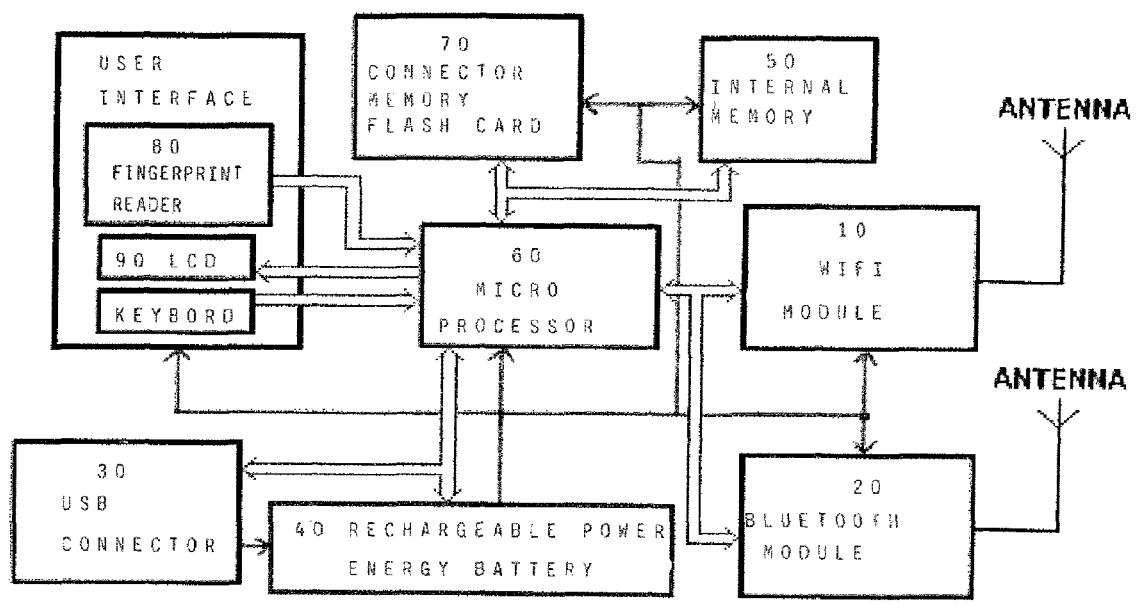
FIG. 1A—it represents the block schematic top-view of the most secure smart card having the fingerprint reader module.

As regards now the most advanced solution referred to in FIG. 1A, it must be observed that the most advanced solution refers to the same universal electronic card, or universal smart card but it has a personalization module (80). The card has the preferred format of 80×55×3 mm, in metallic or plastic material, that includes the following elements:

(10) Module Wi-Fi: It realizes the cordless connection by means of standard IEEE 802.11b.

(20) Bluetooth module: It realizes the cordless connection by means of standard Bluetooth.

(30) USB pin connector: It connects the device to the USB gate, allowing the reload of the battery and the data exchange.

(40) Rechargeable battery: Its autonomy is monitored, indicating to the user the recharge moment.

(50) Internal memory: it records the settings of the user.

(60) Microprocessor: it is responsible for managing all the peripherals.

(70) Card flash memory connector: It allows the use of an external storage, adapting the capacity to the needs (till 2 GB).

(80) Fingerprint module: it detects the fingerprint of the user, checking its authenticity, and it also acts as navigator of the menu.

(90) LCD display: It allows the view of the menu and of operations in progress.

Obviously the same is integrated with antenna.

In the user interface obviously together with the components (80,90) there will also be a series of key caps with control functions, and/or input.

The novelty and originality is the association of all the said elements and in particular: addition of the fingerprint reader (80) for checking, identification and access permission to all the functions.

In the figures it can be seen that the new card looks like a very common credit card, the reduced sizes of internal components will allow to produce a plasticized card and aesthetically able to be customized with prints of logos, images or other.

The same has a support basis in integrated-circuit plastic material with the said components such as microprocessor or CPU, memory, transmission module, battery, LCD screen and ON/OFF button.

As the previous one, the smart card can receive, memorize and transfer multiple data and information simply approaching the electronic apparatus equipped with bluetooth technology and Wi-Fi or higher or similar communication standard, therefore similarly it can communicate with different apparatus in commerce as computers, laptops, palmtops, mobile or cell phones, satellite devices, and other electronic apparatus.

In a similar way, using the radio communication with no need of cables or USB connection, the card can be employed for different uses or applications, but having the USB connection it can also can carry out similar functions of any USB.

The working of the personal fingerprint reader card is illustrated in the block diagram of FIG. 1A.

Start happens when the energy source is connected to the circuit.

At this time the card is off, thus it does not consume energy.

The activation can be carried out through a programming key or by transmission key.

When the programming key is activated, the card comes into programming modality, which means that the received data are stored in the memory.

When the reception and the storing are completed, the card will stop automatically.

Otherwise when one presses the transmission key, the data contained in the memory start to be transmitted.

At the end of the transmission the card goes OFF for saving energy and returns to the initial state.

What is claimed is:

1. A smart card, comprising:
a substantially flat, plastic card;
a circuit of electronic elements integrated in the plastic card, including
a microprocessor;
a memory on which data is stored;
at least one wireless transmission module;
an antenna connected to said wireless transmission module that wirelessly transmits data stored on said memory;
a user interchangeable, substantially flat battery supplying power to said circuit; and
a user interface comprising
an LCD screen;
a hard programming key;
a software module;
wherein said hard programming key sends a signal to said software module activating a programming mode, during which data is received and stored in said memory, and
wherein said software module deactivates said programming mode immediately after all data has been received by said memory;
a hard transmission key that, when activated, causes the card to enter a transmission mode, during which data stored in said memory is transmitted by said antenna, and which automatically turns off when data is no longer being transmitted; and
a fingerprint reader that reads the imprint of a user and compares it to an imprint stored on the card to verify the authenticity of the user before allowing access to any functions of the card and before allowing the card to enter either the programming mode or the transmission mode.

2. The smart card of claim 1, wherein said memory comprises a removable memory card.

3. The smart card of claim 2, wherein said removable memory card is a compact flash card.

4. The smart card of claim 2, wherein said removable memory card is an SD card.

5. The smart card of claim 1, wherein the data stored on said memory includes telephone number data.

6. The smart card of claim 1, wherein the data stored on said memory includes address data.

7. The smart card of claim 1, wherein the data stored on said memory includes financial data.

8. The smart card of claim 1, wherein the data stored on said memory includes audio files.

9. The smart card of claim 1, wherein the data stored on said memory includes video files.

10. The smart card of claim 1, wherein the data stored on said memory includes photos.

11. A smart card, comprising:
a substantially flat, plastic card;
a circuit of electronic elements integrated in the plastic card, including
a microprocessor;
a memory on which data is stored;
at least one wireless transmission module;
an antenna connected to said wireless transmission module that wirelessly transmits data stored on said memory;
a user interchangeable, substantially flat battery supplying power to said circuit; and
a user interface comprising
an LCD screen;
a hard programming key;
a software module;
wherein said hard programming key sends a signal to said software module activating a programming mode, during which data is received and stored in said memory, and
wherein said software module deactivates said programming mode immediately after all data has been received by said memory;
a hard transmission key that, when activated, causes the card to enter a transmission mode, during which data stored in said memory is transmitted by said antenna, and which automatically turns off when data is no longer being transmitted; and
a fingerprint reader that reads the imprint of a user and verifies the authenticity of the user before allowing the card to enter either the programming mode or the transmission mode.

12. The smart card of claim 11, wherein said memory comprises a removable memory card.

13. The smart card of claim 12, wherein said removable memory card is a compact flash card.

14. The smart card of claim 12, wherein said removable memory card is an SD card.

15. The smart card of claim 13, wherein the data stored on said memory includes telephone number data.

16. The smart card of claim 13, wherein the data stored on said memory includes address data.

17. The smart card of claim 13, wherein the data stored on said memory includes financial data.

* * * * *